D. D. Allen,
Stop Cock,

No. 48,883. Patented July 25, 1865.

Witnesses:

Inventor:
D. D. Allen

UNITED STATES PATENT OFFICE.

D. D. ALLEN, OF SOUTH ADAMS, MASSACHUSETTS.

IMPROVEMENT IN VALVES.

Specification forming part of Letters Patent No. 48,883, dated July 25, 1865.

*To all whom it may concern:*

Be it known that I, D. D. ALLEN, of South Adams, Berkshire county, State of Massachusetts, have invented a new and Improved Valve; and I do hereby declare that the following is a full, clear, and exact description thereof, which will enable others skilled in the art to make and use the same, reference being had to the accompanying drawings, forming part of this specification, in which—

Figure 2:
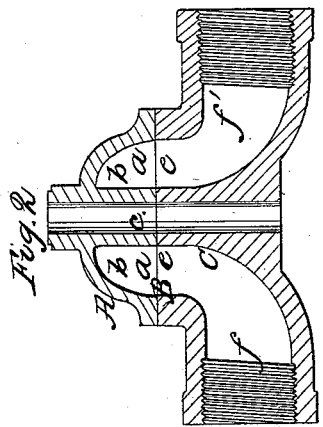
Figure 4:
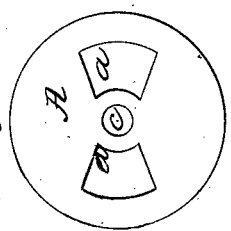
Figure 1:
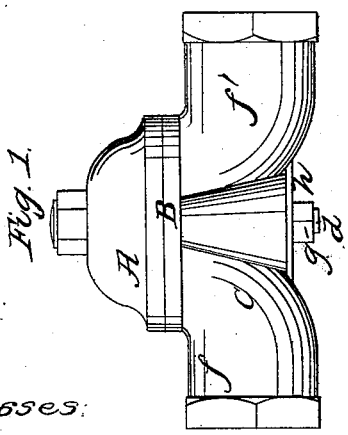
Figure 3:
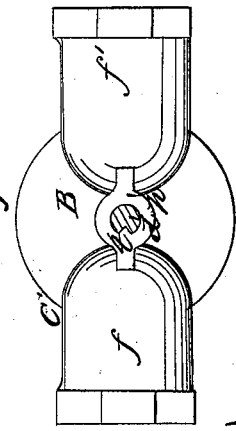

Figure 1 represents a side elevation of this invention; Fig. 2, a longitudinal vertical section of the same; Fig. 3, an inverted plan of the same; Fig. 4, a face view of the valve.

Similar letters of reference indicate like parts.

This invention consists in a flat disk-valve, with two or more passages communicating through the interior of the valve, in combination with a flat seat furnished with two or more ports which communicate with the receiving and discharge pipes, and with a center-pin passing through a central shell in the valve and seat, and held in place by a spring and nut in such a manner that when the valve is turned and the ports in the same made to communicate partially or wholly with the ports in the valve-seat a free and unobstructed communication is effected between the pipes which communicate with the several ports in the seat, and a valve is obtained which is not liable to leak, and to the working parts of which free access can be had with little loss of time.

A represents a valve, cast of metal or made of any other suitable material, with two or more passages or ports, $a$, leading to an annular space, $b$, in the interior of the valve. This space surrounds the central shell, $c$, and it forms the communication between the several ports. Through the central shell passes the screw-bolt $d$, on which the valve turns, and by this screw-bolt the valve is held down upon the seat B, which is formed on the upper surface of a piece, C, of metal or other suitable material, and which communicates through two or more ports, $e$, with the supply and discharge pipes $f\ f'$, as clearly shown in Fig. 2. The bolt $d$ passes through the center of the seat B and piece C, and the nut $g$, which secures the same in its place, bears on a spring, $h$, so as to hold the valve down upon its seat with a yielding pressure. This spring is fitted on the end of the bolt by means of a tongue, $i$, and corresponding groove, so that when the ends of the spring bear on the outer surfaces of the pipes $f\ f'$ by the action of said spring the bolt is prevented from turning, and the valve can be turned independent of the bolt.

A wrench fitting over the polygonal head of the valve, or a handle attached to the same, serves to turn the valve.

If the ports in the valve register with those in the seat, the communication between the supply pipe or pipes $f$ and the discharge pipe or pipes $f'$ is open, or said ports may be so arranged that different sets of pipes can be made to communicate at different times; and if the valve is turned so that its ports do not register with those in the seat, the communication between the supply and discharge pipes is interrupted.

This valve is very simple in its construction. It can readily be drawn up tight to its seat, and when it leaks it is easily ground down tight. It is not liable to become leaky by small impurities lodging on the seat. It requires no packing, and it can be made at such a moderate price that it is altogether preferable to globe-valves or other valves of the usual construction.

I claim as new and desire to secure by Letters Patent—

The valve A C, in combination with the spring $h$, tongue $i$, and bolt $d$, substantially as and for the purpose described.

D. D. ALLEN.

Witnesses:
GEO. W. BOWKER,
E. D. JENKS.